US010797629B2

(12) United States Patent
Lakshmi Narasimha et al.

(10) Patent No.: US 10,797,629 B2
(45) Date of Patent: Oct. 6, 2020

(54) LOW SPEED SENSORLESS ROTOR ANGLE ESTIMATION

(71) Applicant: Texas Instruments Incorporated, Dallas, TX (US)

(72) Inventors: Rajan Lakshmi Narasimha, Dallas, TX (US); David Patrick Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 9 days.

(21) Appl. No.: 16/198,964

(22) Filed: Nov. 23, 2018

(65) Prior Publication Data

US 2020/0169204 A1 May 28, 2020

(51) Int. Cl.
*H02P 21/24* (2016.01)
*H02P 21/22* (2016.01)
*H02P 21/18* (2016.01)

(52) U.S. Cl.
CPC .............. *H02P 21/24* (2016.02); *H02P 21/18* (2016.02); *H02P 21/22* (2016.02)

(58) Field of Classification Search
CPC .. H02P 21/18; H02P 21/0021; H02P 21/0085; H02P 21/24; H02P 21/13; H02P 23/14
See application file for complete search history.

(56) References Cited

U.S. PATENT DOCUMENTS

| 5,585,709 A | * | 12/1996 | Jansen | H02K 17/165 |
| | | | | 318/720 |
| 6,492,788 B1 | * | 12/2002 | Agirman | H02P 21/18 |
| | | | | 318/537 |
| 8,693,220 B2 | * | 4/2014 | Klodowski | H02P 21/141 |
| | | | | 363/37 |
| 9,270,220 B2 | * | 2/2016 | Magee | H02P 6/18 |
| 9,305,548 B2 | | 4/2016 | Kennewick et al. | |
| 9,548,686 B2 | | 1/2017 | Magee | |
| 9,825,564 B2 | | 11/2017 | Magee | |
| 9,991,777 B2 | | 6/2018 | Lynch et al. | |
| 9,998,052 B2 | * | 6/2018 | Shimada | H02P 27/06 |

(Continued)

OTHER PUBLICATIONS

Matthew J. Corley and Robert D. Lorenz, "Rotor Position and Velocity Estimation for a Salient-Pole Permanent Magnet Synchronous Machine at Standstill and High Speeds", IEEE Transactions on Industry Applications, vol. 34, No. 4, Jul./Aug. 1998, pp. 784-789.

(Continued)

*Primary Examiner* — Thai T Dinh
(74) *Attorney, Agent, or Firm* — Michael A. Davis, Jr.; Charles A. Brill; Frank D. Cimino

(57) ABSTRACT

A permanent magnet motor controller injects a periodic signal into a field oriented controller of the brushless motor. Phase currents in stator windings of the brushless motor are measured. A d-axis current and a q-axis current are determined with a transform of the phase currents. The d-axis current and the q-axis current are demodulated to extract an angle dependent current signature that includes a sine component of a rotor angle estimate and a cosine component of the rotor angle estimate. The rotor angle estimate is determined by processing the sine component and cosine component.

19 Claims, 11 Drawing Sheets

(56) References Cited

U.S. PATENT DOCUMENTS

| | | | | |
|---|---|---|---|---|
| 2007/0040528 A1* | 2/2007 | Tomigashi | ............... | H02P 21/22 318/650 |
| 2011/0309781 A1* | 12/2011 | Tomigashi | ............... | H02P 21/13 318/504 |
| 2014/0225548 A1* | 8/2014 | Xu | ..................... | H02P 6/183 318/400.33 |
| 2014/0327379 A1* | 11/2014 | Yang | ..................... | H02P 6/18 318/400.02 |
| 2015/0357956 A1* | 12/2015 | Shimada | ................. | H02P 6/181 318/400.02 |
| 2017/0006303 A1 | 1/2017 | Sethuraman et al. | | |

OTHER PUBLICATIONS

Ji-Noon Jang, et al, "Analysis of Permanent-Magnet Machine for Sensorless Control Based on High-Frequency Signal Injection", IEEE Transactions on Industrial Applications, vol. 40, No. 6, Nov./Dec. 2004, pp. 1595-1604.

Limei Wang and Robert D. Lorenz, "Rotor Position Estimation for Permanent Magnet Synchronous Motor Using Saliency-Tracking Self-Sensing Method", Industry Applications Conference, 2000, Oct. 8-12, 2000, Rome, Italy, pp. 445-450.

Patrick L. Jansen and Robert D. Lorenz, "Transducerless Position and Velocity Estimation in Induction and Salient AC Machines", IEEE Transactions on Industry Applications, vol. 31, No. 2, Mar./Apr. 1995, pp. 240-246.

Patrick Carner, "Increased Integration, Improved Feature Sets and New Software for Motor Control Systems: C2000 Piccolo F2805x microcontrollers", whitepaper, Texas Instruments, Inc., Nov. 2012, pp. 1-9.

"Clarke & Park Transforms on the TMS320C2xx", Application Report Literature No. BPRA048, Texas Instruments, Inc., 1997, pp. 1-46.

Bianchi, N. et al. "Effect of Stator and Rotor Saturation on Sensorless Rotor Position Detection." IEEE Transactions on Industry Applications, vol. 49, No. 3, May/Jun. 2013, pp. 1333-1342.

Barcaro, M. et al. "Iron Saturation Impact on High Frequency Sensorless Control of Synchronous Permanent Magnets Motor." 978-1-5090-2538-1 @2016 IEEE, pp. 1085-1091.

Li, Y. et al. "Improved Rotor-Position Estimation by Signal Injection in Brushless AC Motors, Accounting for Cross-Coupling Magnetic Saturation." IEEE Transactions on Industry Applications, vol. 45, No. 5, Sep./Oct. 2009, pp. 1843-1850.

Raca, D. et al. "Carrier-Signal Selection for Sensorless Control of PM Synchronous Machines at Zero and Very Low Speeds." IEEE Transactions on Industry Applications, vol. 46, No. 1, Jan./Feb. 2010, pp. 167-178.

Reigosa, D. D. et al. "Measurement and Adaptive Decoupling of Cross-Saturation Effects and Secondary Saliences in Sensorless Controlled IPM Synchronous Machines." IEEE Transactions on Industry Applications, vol. 44, No. 6, Nov./Dec. 2008. pp. 1758-1767.

* cited by examiner

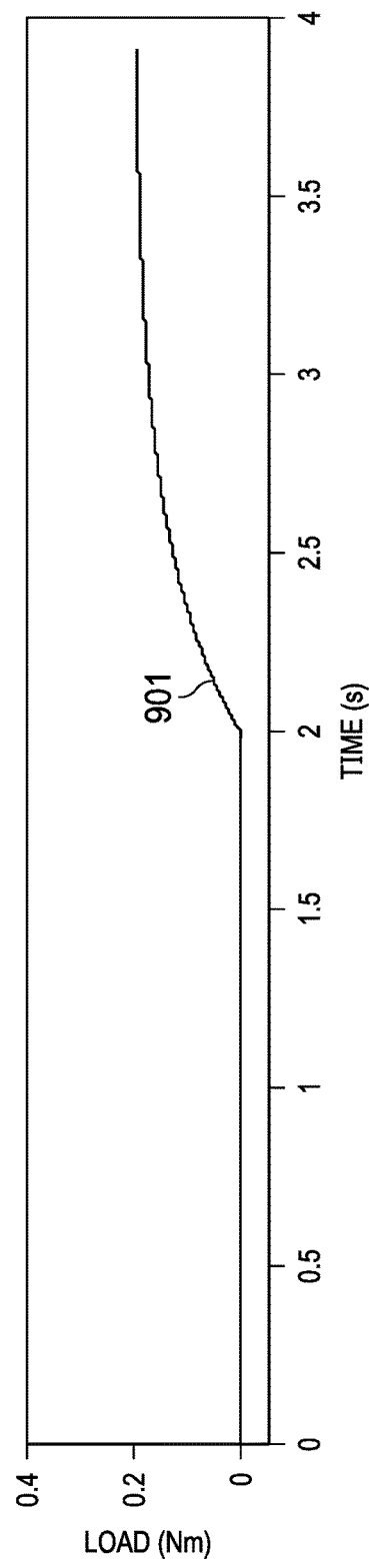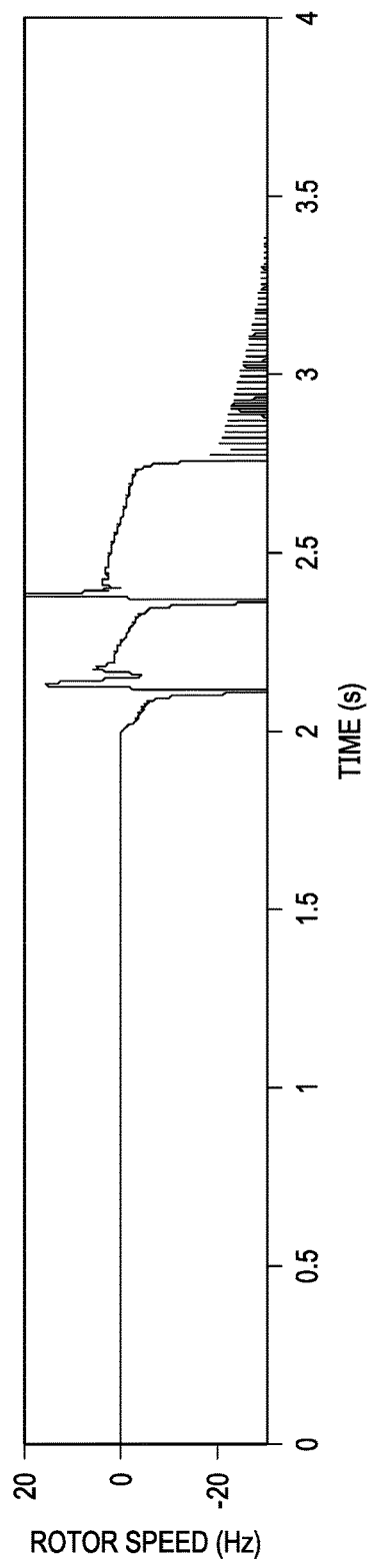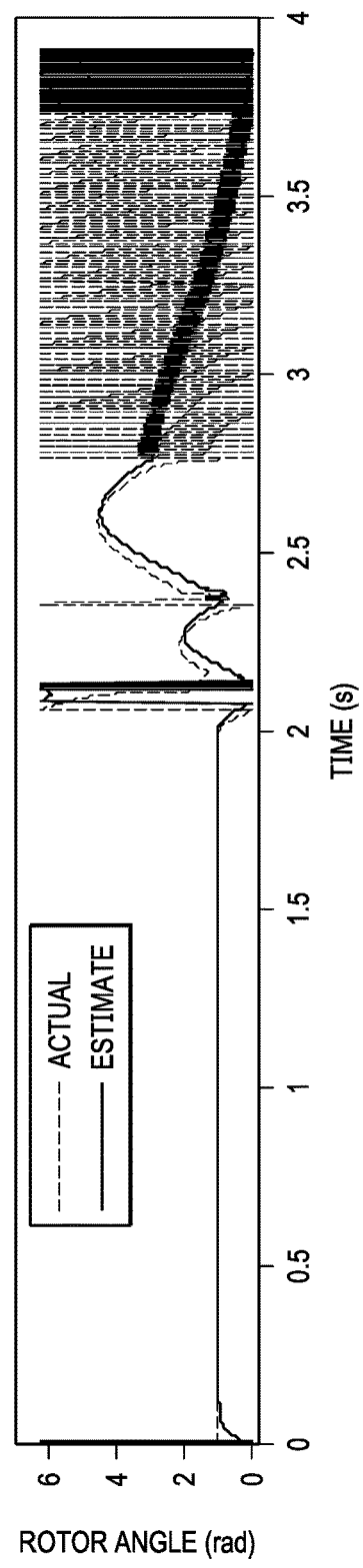

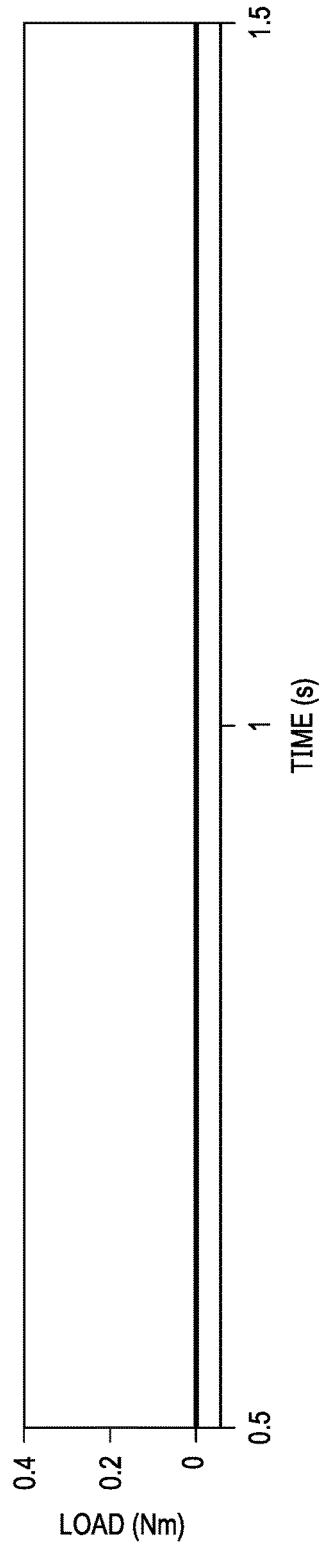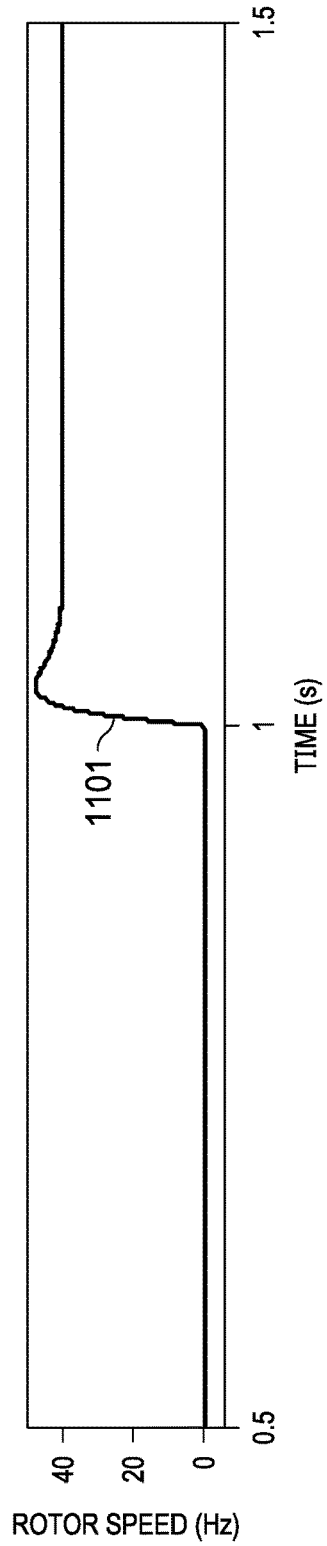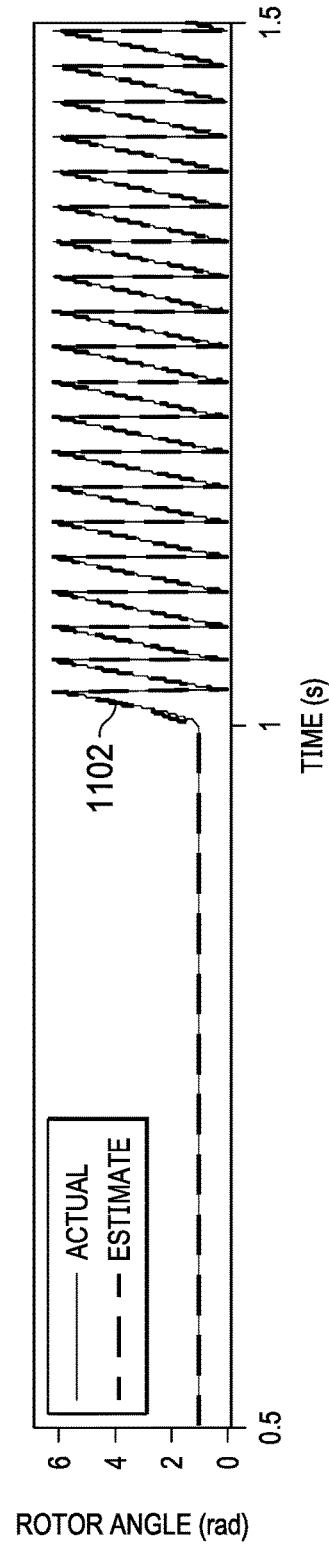

LOW SPEED SENSORLESS ROTOR ANGLE ESTIMATION

TECHNICAL FIELD

This relates to rotor angle estimation for permanent magnet and brushless direct current motors.

BACKGROUND

Permanent magnet (PM) and brushless direct current (BLDC) motors are used in computer peripherals (disk drives, printers), hand-held power tools, vehicles ranging from model aircraft to automobiles, etc. PM and BLDC motors eliminate the need for brushes and provide high power to weight ratio, high speed, and high torque generation.

A permanent magnet motor is a type of motor where a fixed stator causes rotation of a movable rotor. The rotor typically includes multiple magnets embedded in or connected to the rotor, and the stator typically includes multiple conductive windings. Electrical current in the windings generates a rotating magnetic field that interacts with the magnets of the rotor, causing the rotor to rotate. Because the stator has multiple windings, the motor load as seen by the controller is inductive.

"Sensorless" motor control refers to an approach where one or more characteristics of a motor, such as motor speed or rotor position, are mathematically derived without direct sensor measurement. Sensorless motor control typically avoids the use of separate speed and position sensors that are mechanically attached to a motor.

SUMMARY

A brushless motor controller injects a periodic signal into a field oriented controller of the brushless motor. Phase currents in stator windings of the brushless motor are measured. A d-axis current and a q-axis current are determined with a transform of the phase currents. The d-axis and the q-axis currents are demodulated to extract an angle dependent current signature that includes a sine component of a rotor angle estimate and a cosine component of the rotor angle estimate. The rotor angle estimate is determined by processing the sine component and the cosine component.

BRIEF DESCRIPTION OF THE DRAWINGS

FIGS. 9A-9C are plots illustrating operation of a PLL observer.

FIGS. 10A-10C, 11A-11C, and 12A-12C are plots illustrating operation of the rotor angle estimation logic of FIG. 8.

DETAILED DESCRIPTION

Figure 1:
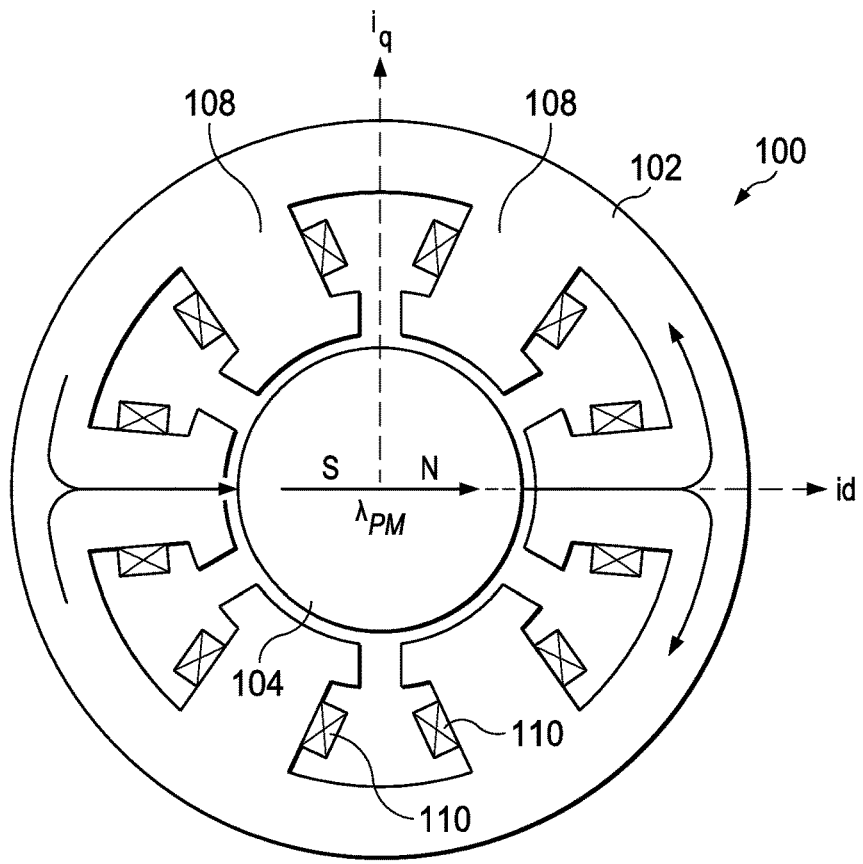
FIG. 1 is a cross-sectional view of a motor with a permanent magnet rotor.

In the drawings, like elements are denoted by like reference numerals for consistency.

The challenge of low-speed sensorless position estimation is well-documented; see, for example: M. J. Corley and R. D. Lorenz. "Rotor position and velocity estimation for a salient pole PMSM at standstill and high speeds." The absence of a significant back-EMF signal at low rotor speeds necessitates the employment of high-frequency signal injection methods that exploit rotor saliency to estimate rotor angle based on rotor position dependent signatures in voltage and current. These algorithms can be partitioned into two stages, namely, the extraction of a position error dependent signature followed by a tracking observer such as a phase locked loop (PLL) that updates the estimated position in order to drive the position error to zero. Such approaches can fail at large step changes in load because of a breakdown in the linearity of the PLL model.

An approach is presented herein to overcome limitations in rotor position sensing based on a PLL model due to large step changes in load that may cause a breakdown in the linearity of the PLL model. The approach described hereinbelow improves the angle estimation accuracy by compensating for phase lags introduced by a demodulation process. Information from the sine and cosine components of the angle error may be employed at high values of angle error where prior methods fail. Effective use of angle error information at large values of angle error provides a robust solution and may be extended to arbitrary mappings between angle error and current signature.

As will be described in more detail hereinbelow, extraction of angle information from d and q channels may be performed and then followed by a look up table (LUT) and a phase compensator block. Improved estimation accuracy at slow motor speed may be provided by compensating for demodulation functions in this manner.

The systems and methods that are used vary depending on the speed of the motor. When the motor is stationary, or more specifically, when the rotor is stationary relative to the stator, the position of the rotor is determined by injecting a square wave voltage into the motor and measuring the location or phase and direction of magnetic flux. The position of the rotor refers to the angle of the rotor and the terms "rotor position" and "rotor angle" are used synonymously. When the motor is operating at low speed, the rotor velocity is determined by injecting or superimposing a square wave onto a driving voltage of the motor and measuring the current into the motor. When the motor is operating at high speed, conventional systems and methods based on back emf (electromagnetic field) may be used to determine the position of the rotor.

A cross sectional view of an example motor 100 is shown in FIG. 1. Motor 100 includes a stator 102 and a rotor 104. The stator 102 is fixed and the rotor 104 rotates relative to the stator 104. The stator 102 has a plurality of teeth 108 extending proximate the rotor 104. Each of the teeth 108 is wound by a conductor to form a coil or winding 110 that generates a magnetic field when current flows in the conductor. The rotor 104 has a single magnet or a plurality of magnets attached to it. In the examples described herein, the rotor 104 has a single magnet attached thereto or located therein. In the example of FIG. 1, the magnet in the rotor 104 has an orientation denoted by its north and south poles, N and S, respectively. The motor 100 operates by changing the magnetic fields produced by the windings 110, which causes the teeth 108 to push or pull on the magnet in the rotor 104, which in turn causes the rotor 104 to rotate. Therefore, by controlling the current input to the motor 100, which is input to the stator 102, the speed and torque of the motor 100 are controlled.

The maximum torque of the motor 100 is generated when the orientation of the input current waveform to the windings 110 is approximately perpendicular to the position of the magnetic flux field in the rotor 104. For permanent magnet motors, such as the motor 100, the flux orientation is equal to the position of the rotor 104. As a result, the maximum torque is achieved in the motor 100 if the instantaneous position of the rotor 104 is known so that the input current can be positioned accordingly. The current position refers to the phase of the input current in the windings 110 relative to the position of the rotor 104. By using the devices and methods disclosed herein, the position of the rotor 104 is quickly determined, which enables a motor controller (not shown in FIG. 1) to maximize the torque output of the motor 100.

Figure 2:
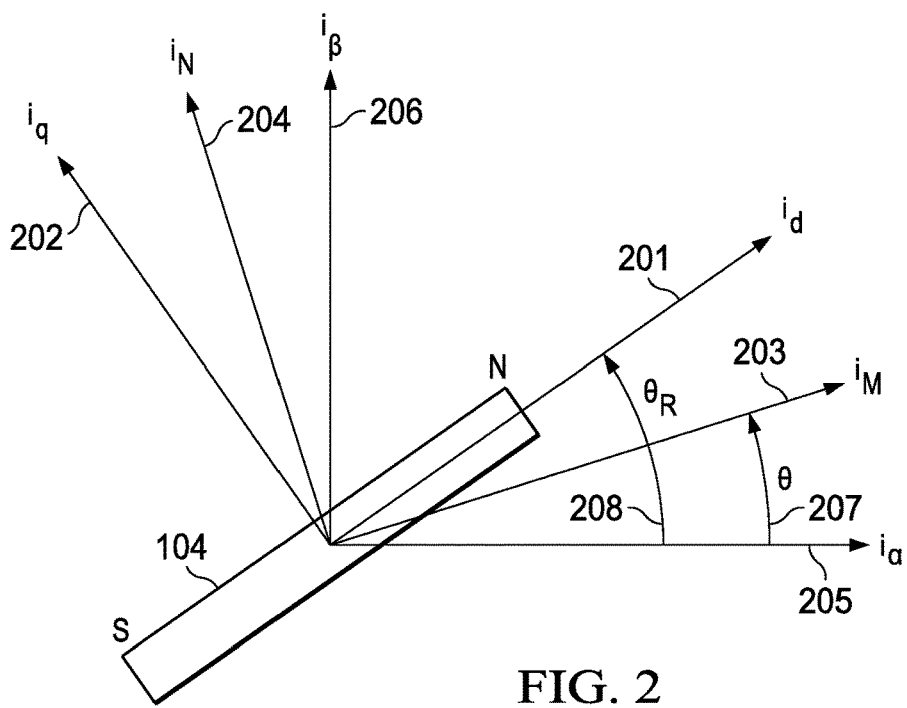
FIG. 2 illustrates various coordinate systems that are associated with the rotor and motor of FIG. 1.

FIG. 2 illustrates various coordinate systems that are associated with the rotor 104 and motor 100 of FIG. 1. The coordinate systems are referenced according to currents associated with the stator 102, FIG. 1, which are referenced to the rotor 104. The currents iq and id relate to the q-axis 202 and the d-axis 201 of the motor 100 and are fixed with respect to the rotor 104. The d/q-axes relate to field-oriented control of the motor 100 and are orthogonal. The $i_M$-axis 203 and $i_N$-axis 204 are arbitrary axes that are used as references for determining the position of the rotor 104. The $i_M$ and $i_N$-axes may be predetermined axes in the motor 100 from which the position of the rotor 104 is determined. The $i_a$-axis 205 and the $i_\beta$-axis 206 represent an orthogonal coordinate system where the $i_a$-axis is aligned with the phase of a motor winding as described hereinbelow. The angle of the rotor 104 based on the angle between the $i_a$-axis and the $i_M$-axis is referred to as the angle $\Theta$ 207. A rotational angle $\Theta_R$ 208 is defined as the angle between the $i_a$-axis and the $i_d$-axis. As the rotor 104 rotates, the rotational angle $\Theta_R$ changes and the change per unit time is equal to the velocity of the rotor 104.

Figure 3:
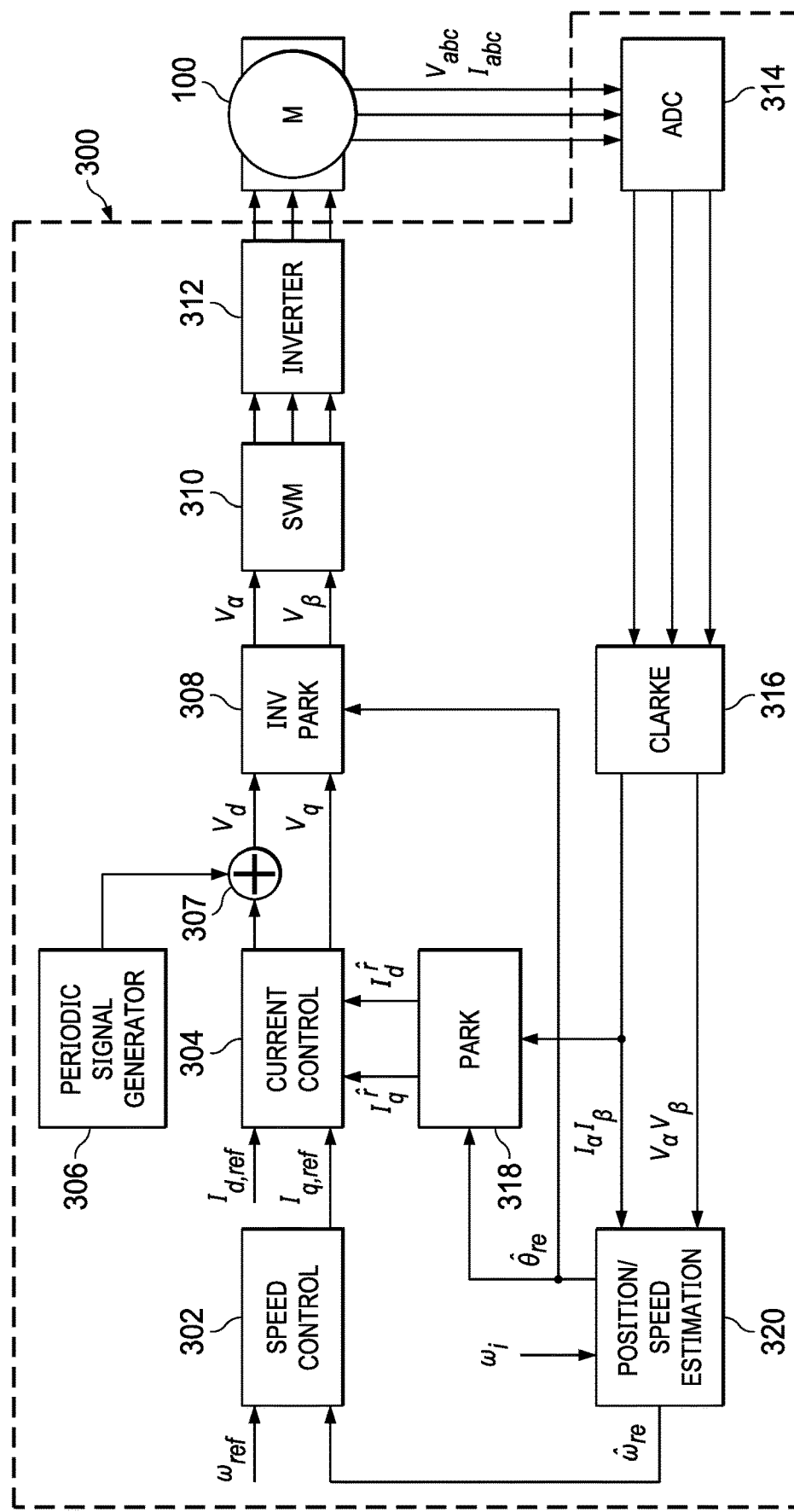
FIG. 3 is a block diagram of a sensorless motor control based on periodic signal injection.

FIG. 3 is a block diagram of a sensorless motor control based on periodic signal injection (PSI). Table 1 lists various terms that are used in the figures and the discussion hereinbelow.

TABLE 1

Symbols and Notations

| Variable/ Symbol | Description | Units |
|---|---|---|
| $R_s$ | Per phase resistance | Ohm |
| $L_d, L_q$ | d-axis and q-axis inductance respectively | Henry |
| $L_0$ | $(L_d + L_q)/2$ | Henry |
| $L_1$ | $(L_d - L_q)/2$ | Henry |
| p | Derivative operator d/dt | /s |
| J | Total inertia rotor and color wheel | kg*m² |
| P | Number of pole pairs | |

TABLE 1-continued

Symbols and Notations

| Variable/ Symbol | Description | Units |
|---|---|---|
| B | Friction damping factor | Nm/(rad/s) |
| $\lambda_m$ | Back-EMF constant | Wb |
| $\omega_m, \omega_{re}$ | Rotor mechanical, electrical frequency | rad/s |
| $f_m, f_e$ | Rotor mechanical, electrical frequency | Hz |
| $f_i, \omega_i$ | Injection frequency | Hz or rad/s |
| $\omega_{ref}$ | Rotor reference electrical frequency | rad/s |
| $\theta_{re}, \hat{\theta}_{re}, \tilde{\theta}_{re}$ | Rotor electrical angle, estimate and estimation error respectively | rad |
| $V_\alpha, V_\beta$ | Voltages in the αβ reference frame | V |
| $V_d, V_q$ | Voltages in the d-q reference frame | V |
| $E_a, E_b, E_c$ | Phase back-emf signals | V |
| $V_n$ | Neutral voltage to ground | V |
| $I_a, I_b, I_c$ | Phase currents | A |
| $I_\alpha, I_\beta$ | Currents in the αβ reference frame | A |
| $I_d, I_q$ | Currents in the d-q reference frame | A |

The field oriented controller 300 includes a speed controller 302 that receives a reference speed input signal of $\omega_{ref}$ from a user or external source. The speed controller 302 compares the reference speed input $\omega_{ref}$ to an estimated speed $\hat{\omega}_{re}$ output from the position speed estimation logic 320. The output of the speed controller 302 is a reference current in the q axis that is compared to the measured current in the q axis by current control 304. Current controller 304 generates a q axis voltage $V_q$. An input $I_{d,ref}$ is also received from an external source and is compared to the measured current $I_d$ by current controller 304 which generates a d axis driving voltage $V_d$.

In this example, the periodic signal 306 is approximately a square wave signal having a frequency within a range of approximately 2 to 10 KHz. The periodic signal 306 is injected via adder 307 at the output of the current controller 304 in an appropriately selected coordinate frame, such as d-q frame 201, 202 FIG. 2. The periodic signal 306 results in a periodic component in driving voltage $V_d$, which is demodulated to generate a signal whose amplitude varies proportional to $\sin(2\tilde{\theta}_{re})$, which is the sine of twice the angle error.

The voltages $V_q$ and $V_d$ are input to an inverse Park transform logic 308 that generates the voltages in the alpha/beta domain $V_{\alpha\beta}$, see axis 205, 206 in FIG. 2.

The voltages in the alpha/beta domain $V_{\alpha\beta}$ are input to a space vector modulator (SVM) 310. The SVM 310 generates a three-phase driving signal for the motor 100, pulse width modulates (PWM) it, and amplifies the resultant PWM signal. The amplified three-phase PWM signals are then provided to a three-phase inverter 312 to drive the motor 100.

Current sensors (not shown) monitor the current into the motor 100 provided by inverter 312. The current sensors may be low value resistors that produce a voltage signal that is proportional to the phase currents in motor 100. In some examples, one of the three phases is monitored and in other examples, two or three phases are monitored. The voltage signals are analog values and are input to an analog to digital converter (ADC) 314, which outputs digital values representing the measured currents. The digital values of the current are input to a Clarke transform function 316 that outputs the alpha/beta domain currents $I_\alpha, I_\beta$ or representations of the currents $I_\alpha, I_\beta$, see axis 205, 206 in FIG. 2.

The currents $I_{\alpha\beta}$ are input to a Park transform function 318 that performs a Park transform. The estimated rotor angle $\hat{\theta}_{re}$ is input to the Park transform 318 as described in more detail hereinbelow. The Park transform function 318 generates the currents $i_q$ and $i_d$, or estimated values representing the currents, as described above. The Park transform device 318 uses the rotor angle $\hat{\theta}_{re}$ in determining or calculating the currents $i_q$ and $i_d$. The output currents of the Park transform function 318 are input to current controller 304.

The alpha/beta domain currents $I_{\alpha\beta}$ or representations of the currents $I_{\alpha\beta}$ are also input to the position speed estimation (PSE) logic 320. The PSE logic 320 generates the estimated rotor angle $\hat{\theta}_{re}$ and the estimated velocity $\hat{\omega}_{re}$ using PLL tracking observer 424 (FIG. 4) or a Luenberger observer 624, FIG. 6.

Figure 4:
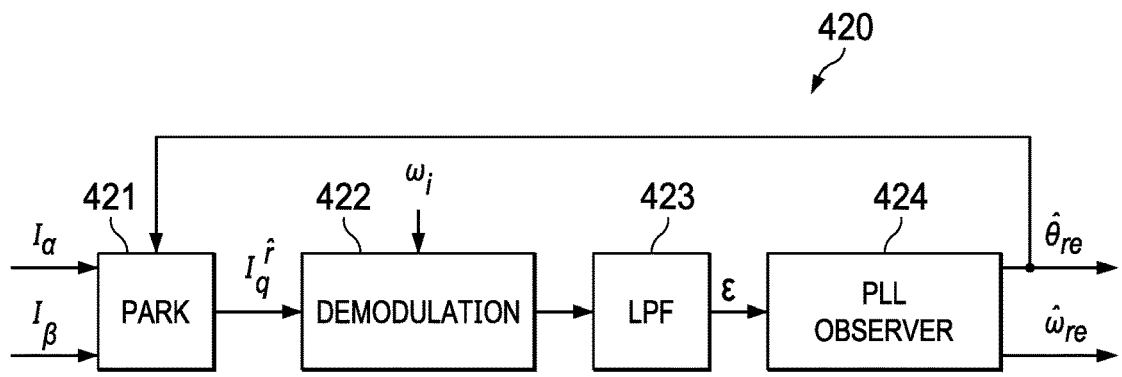
FIG. 4 is a more detailed block diagram position sensor that may be used in the sensorless drive control of FIG. 3 to extract position information.

FIG. 4 is a more detailed block diagram of a tracking observer based position estimator 420 that may be used in the sensorless drive control of FIG. 3 to extract position information. As mentioned hereinabove, the periodic signal 306 results in a periodic current component, which is demodulated to generate a signal whose amplitude variation is proportional to $\sin(2\tilde{\theta}_{re})$, i.e, the sine of twice the angle error, as shown in expression 1.

$$\begin{bmatrix} V_\alpha \\ V_\beta \end{bmatrix} = \begin{bmatrix} R_s + p(L_0 + L_2 \cos 2\theta_{re}) & pL_2 \sin 2\theta_{re} \\ pL_2 \sin 2\theta_{re} & R_s + p(L_0 - L_2 \cos 2\theta_{re}) \end{bmatrix} \begin{bmatrix} I_\alpha \\ I_\beta \end{bmatrix} + \quad (1)$$

$$\omega_e \lambda_m \begin{bmatrix} -\sin \theta_{re} \\ \cos \theta_{re} \end{bmatrix}$$

When a periodic voltage signal is injected in the d-axis of the estimated reference frame, the high-frequency components of the reflected currents in the d and q axes are given by expression (2).

$$\begin{bmatrix} I_d^{\tilde{r}} \\ I_q^{\tilde{r}} \end{bmatrix} = \frac{V_i \sin(\omega_i t)}{\omega_i} * \frac{1}{L_0^2 - L_2^2} \begin{bmatrix} L_0 - L_2 \cos 2(\hat{\theta}_{re} - \theta_{re}) \\ L_2 \sin 2(\hat{\theta}_{re} - \theta_{re}) \end{bmatrix} \quad (2)$$

A more detailed mathematical analysis of signal injection is provided in U.S. Pat. No. 9,270,220, entitled "circuits and Methods of Determining Position and Velocity of a Rotor," granted Feb. 23, 2016, which is incorporated by reference herein. The term "p" used herein in expression (1) denotes a derivative operator d/dt. Expanding expression (1) yields the same equations shown in U.S. Pat. No. 9,270,220.

It is evident that the error signal in the current is modulated up by the carrier frequency. Park transform 421 generates q-axis current $I_q$ from currents $I_\alpha$, $I_\beta$. The q-axis current in the estimated reference frame $I_q^{\tilde{r}}$ is demodulated by demodulation logic 422 and low pass filtered (LPF) in LPF 423 to attenuate the high frequency components at $2\omega_i$. The goal of this step is to extract an error signal, proportional to $\sin 2(\hat{\theta}_{re}-\theta_{re})$.

One approach works on the principle that when the angle error is small, $\sin(2(\hat{\theta}_{re}-\theta_{re}))\sim2(\hat{\theta}_{re}-\theta_{re})$, i. e, the output of the demodulation step can be used as a substitute for the position error. An observer can be designed to drive the angle error to zero and extract rotor angle.

Figure 5:
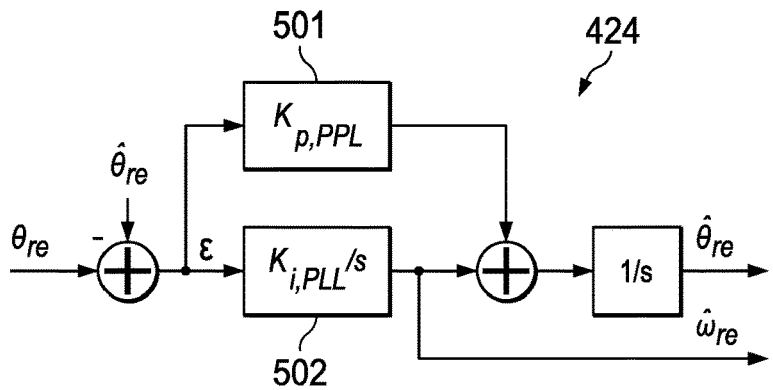
FIG. 5 is a block diagram of a PLL observer to determine rotor angle.

FIG. 5 is a more detailed block diagram of a PLL observer 424 (FIG. 4) which may be used to determine rotor angle. PLL observer 424 includes a proportional gain (Kp) block 501 and an integral gain (Ki) block 502.

Figure 6:
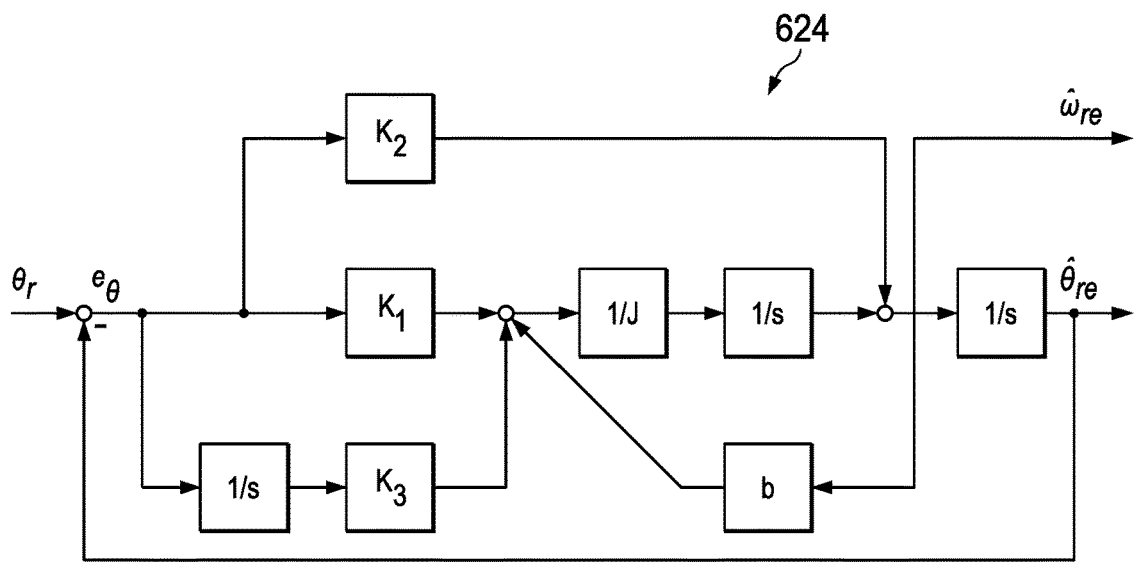
FIG. 6 is a block diagram of a Luenberger observer to determine rotor angle.

FIG. 6 is a block diagram of a Luenberger observer 624 which may be used in place of PLL observer 424 (FIG. 4) to determine rotor angle. The Luenberger observer operates on the error signal $e_\theta$ defined by equation (3). Thus, it operates on the $\Delta i_N$ current value, which is the change in current level in the $i_N$ direction due to the injected square wave signal. As the Luenberger observer 624 drives the error signal $e_\theta$ to zero, the angle $\theta$ goes to $\theta_R$, the $i_M$ axis aligns with the $i_d$ axis and the $i_N$ axis aligns with the $i_q$ axis. The error $e_\Theta$ may be driven between the rotor angle $\Theta_R$, 208 in FIG. 2, and the arbitrary angle $\Theta$ 207 in FIG. 2 to zero. When the Luenberger observer 624 drives the error $e_\Theta$ to zero, the arbitrary angle $\Theta$ is equal to the rotor angle $\Theta_R$, and thus the output of the Luenberger observer ($\Theta$) is the rotor angle $\Theta_R$.

The constants K1, K2, and K3 are observer gains that, are set so that the poles of the Luenberger observer 624 are stable. Mathematically, the poles of the transfer function of the Luenberger observer 624 are analyzed to make sure that they are in the left half plane of the s-domain, which assures stability. Because the Luenberger observer 624 is stable, the error $e_\Theta$ is guaranteed to go to zero in a finite amount of time. The term b is a viscous damping term that represents any resistive torque in the motor 100, FIG. 1, wherein the torque is proportional to angular velocity $\omega$. The term J is the rotational inertia experienced by the motor 100 and is derived from the rotor shaft and any inertial load in a conventional manner. Using small angle approximations and the Luenberger observer 624, the error $\tilde{\theta}_{re}$ can be written as shown by expression (3).

$$\tilde{\theta}_{re} = \hat{\theta}_{re} - \theta_{re} \quad (3)$$

$$\cong \frac{L_0^2 - L_2^2}{2 \cdot V_{sq} \cdot \Delta T \cdot L_2 \cdot sgn(\sin(\omega_{sq}I))} \Delta i_n$$

$$= K \frac{\Delta i_N}{sgn(\sin(\omega_{sq}I))}$$

where the constant K is defined by expression (4).

$$K = \frac{L_0^2 - L_2^2}{2 \cdot V_{sq} \cdot \Delta T \cdot L_2} \quad (4)$$

By using the Luenberger observer 624, the system is guaranteed to converge if the poles of the observer are correctly designed. The inductance variance is very small, so the term $L_2$ is a small value and will not have a very significant effect on the value of K. In some embodiments, the inductance is measured as a function of rotor angle $\Theta_R$, so that the value of $L_2$ is measured.

Figure 7:
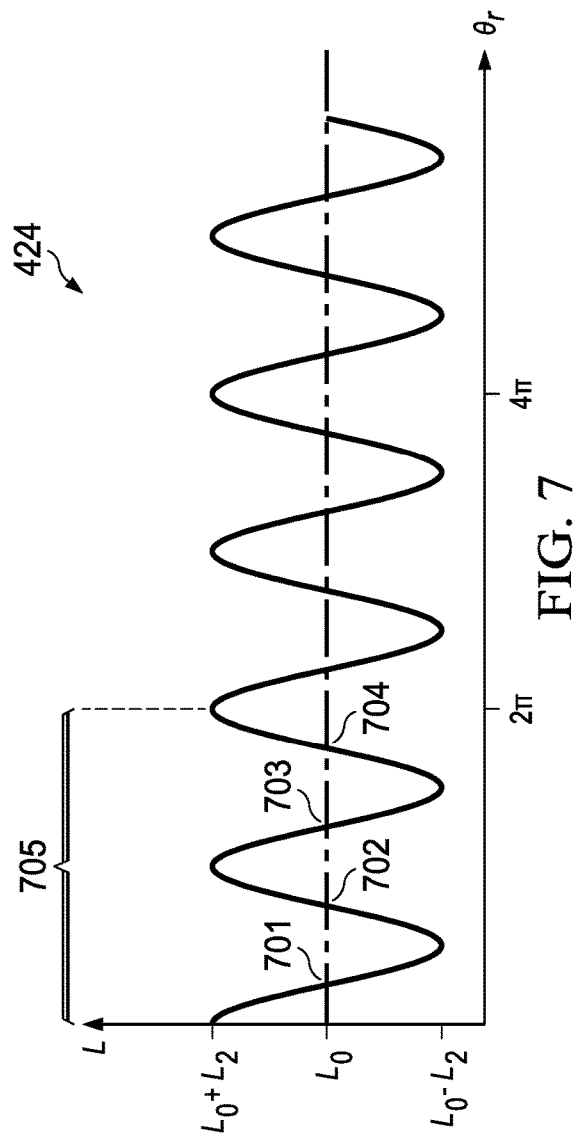
FIG. 7 is a plot illustrating a saliency-based inductance signature as a function of rotor angle.

FIG. 7 is a plot illustrating a saliency-based inductance signature as a function of rotor angle. The use of just the sine component of the error term as mentioned hereinabove to resolve position introduces ambiguity in the angle estimate. This ambiguity in angle estimate is illustrated at rotor angles 701, 702, 703, 704, where a given inductance value can correspond to four different values of rotor angle per period, such as in period 705 which covers a full rotation of $2\pi$ radians.

One part of this ambiguity, a factor of two, arises from the fact that the periodic component in the current is a function of twice the angle error. Thus, both the north-south (N-S) and south-north (S-N) rotor orientations lead to the same inductance value. This issue can be resolved by exploiting the saturation behavior of the rotor core as described in U.S. Pat. No. 9,270,220, entitled "Circuits and Methods of Determining Position and Velocity of a Motor," granted Feb. 23, 2016, which is incorporated by reference herein. The behavior of the current magnitude for different orientations of the magnet in the rotor 104 (FIG. 1) with respect to the stator windings 110 (FIG. 1) is used to determine the orientation of the rotor 104. In this case, the injected signal 306 (FIG. 3) is a square wave. The average current value resulting from the injected voltage square wave is calculated. For the case when the average current is greater than zero, the rotor 104 is aligned with the stator 102 (FIG. 1), For the case when the average current is less than zero, the rotor 104 is opposed to the stator 102. In the case where the rotor 104 is opposed to the stator 102, the rotor angle $\theta_{re}$ should be adjusted by $\pi$.

The remaining factor of two in the rotor position ambiguity arises from the use of only the sine component of the angle error in the estimation process. The low-pass filtering logic 423 (FIG. 4) in the demodulation process introduces a phase delay in the error signal. Therefore, the low-pass filtered demodulated error signal is proportional to $\sin(2(\hat{\theta}_{re}-\theta_{re}+\delta))$. The phase delay introduced by the low pass filter increases with the attenuation desired for the periodic components of the demodulated signal. The assumption that $\sin(2(\hat{\theta}_{re}-\theta_{re}))\sim 2(\hat{\theta}_{re}-\theta_{re})$ can breakdown when the magnitude of the angle error becomes large. This behavior can happen due to sudden large load transients during which the actual rotor angle can deviate significantly from the estimated rotor angle.

Figure 8:
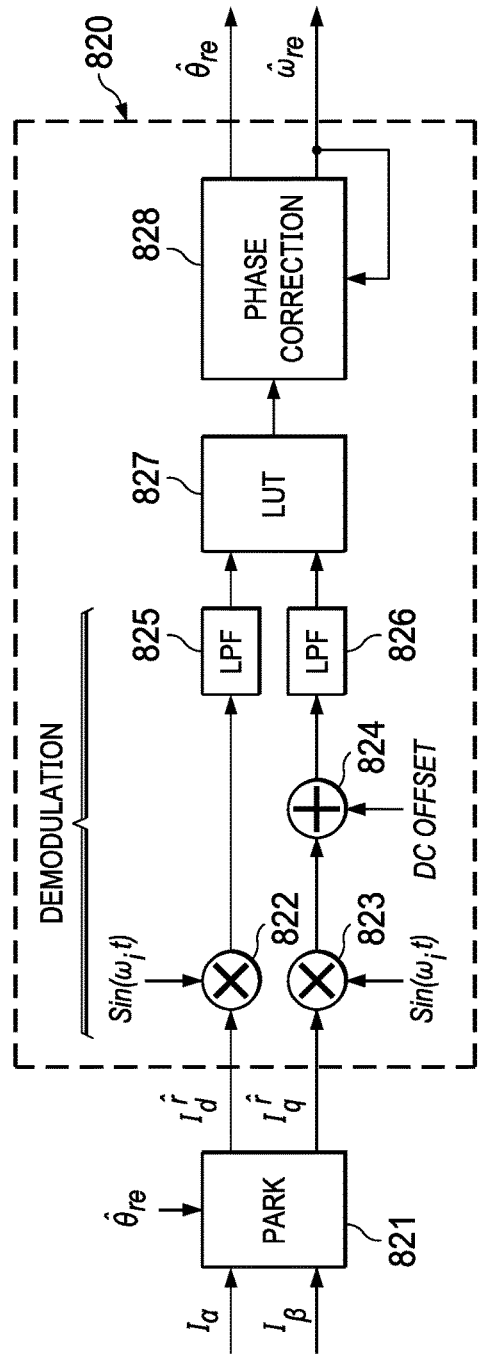
FIG. 8 is a block diagram of rotor angle estimation logic that uses a look-up table (LUT) and phase compensation.

FIG. 8 is a block diagram of rotor angle estimation logic 820 that uses a look-up table (LUT) 827 and phase compensation logic 828. Rotor angle estimation (RAE) logic 820 may be included within position/speed estimation logic 320 (FIG. 3). The alpha/beta domain currents $I_\alpha$, $I_\beta$ are received by Park transform logic 821 from Clarke transform logic 316 (FIG. 3). RAE logic 820 seeks to extract the sine and cosine components of the angle error by demodulating both components $I_d^{\hat{r}}$ and $I_q^{\hat{r}}$ generated by Park transform logic 821. The $I_d$ current is demodulated using $\sin(\omega_i t)$ by multiplier 822 and low pass filtered using LPF 825. The $I_q$ current is demodulated using $\sin(\omega_i t)$ by multiplier 823 and low pass filtered using LPF 826. The demodulated q-axis component contains a DC term shown in expression (5) which can be derived from Equation (2).

$$\frac{V_i}{\omega_i} * \frac{L_0}{L_0^2 - L_2^2} \quad (5)$$

This component can be subtracted out by subtractor 824 assuming knowledge of the amplitude of the injected signal $V_i$, it's frequency $\omega_i$, and the inductances $L_0$ and $L_2$. Standard averaging methods to remove the DC component are limited at lower speeds where the attenuation provided by the averaging function is small. In other examples, another known or later developed techniques may be used to remove the DC term.

The outputs of the demodulation stage can be processed by a look up table 827 to extract an intermediate estimate of rotor angle. The LUT may be created based on simulations of the motor or by measurements of an actual motor, for example. The LUT may be organized as a two-dimensional array that is indexed using both the sine and the cosine components.

This estimate is further corrected for the phase lag introduced by the demodulation filters using LPF phase compensation logic 828 to obtain an accurate estimate of the rotor angle. Compensation logic 828 generates rotor angle $\hat{\theta}_{re}$ which is then provided to Park transform logic 318 (FIG. 3) and to Park transform logic 821 that generate the d-axis and q-axis currents. Compensation logic 828 also generates rotor speed estimate $\hat{\omega}_{re}$ which is then provided to speed control logic 302 (FIG. 3).

It can be seen from expression (2) that the sine and cosine parts of the angle error are modulated by the injected frequency. Hence, they are first demodulated to baseband, and low pass filtered to remove the high frequency demodulation byproduct. The DC offset present as an additive term to the cosine component is first removed. The angle is initially estimated via a look up table (LUT) that implements an inverse tangent function in the simple case or a more sophisticated mapping that represents the relation between the angle error and the current signature. The sophisticated mapping may be determined by simulation of a motor or by testing of an actual motor, for example.

FIGS. 9A-9C are plots illustrating operation of a motor with a motor control using only a PLL tracking observer. FIG. 9A is a plot of load (units of Newton meter) vs. time; FIG. 9B is a plot of rotor speed (units of Hertz) vs. time (units of seconds); FIG. 9C is a plot of rotor angle (units of radians) vs. time (units of seconds). These plots illustrate a PLL based tracking approach can, fail when a large load step drives the PLL out of lock and causes the "small angle error" assumption to become invalid. In this example, the application of a 73% rated load step on a stationary rotor at time equal to 2 seconds as indicated at 901 causes the PLL to go out of lock.

Figure 10A:
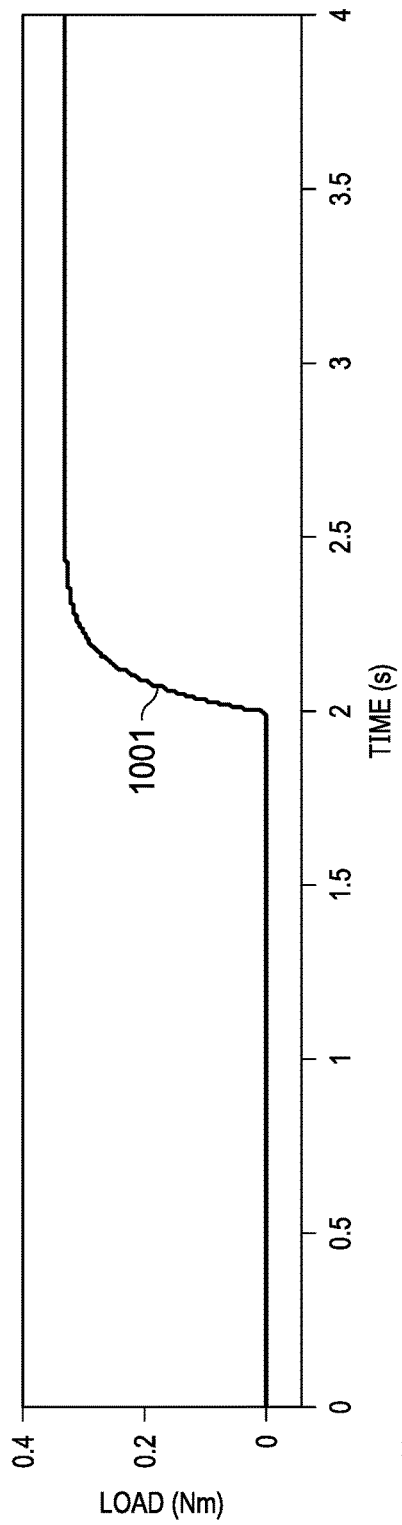
Figure 10B:
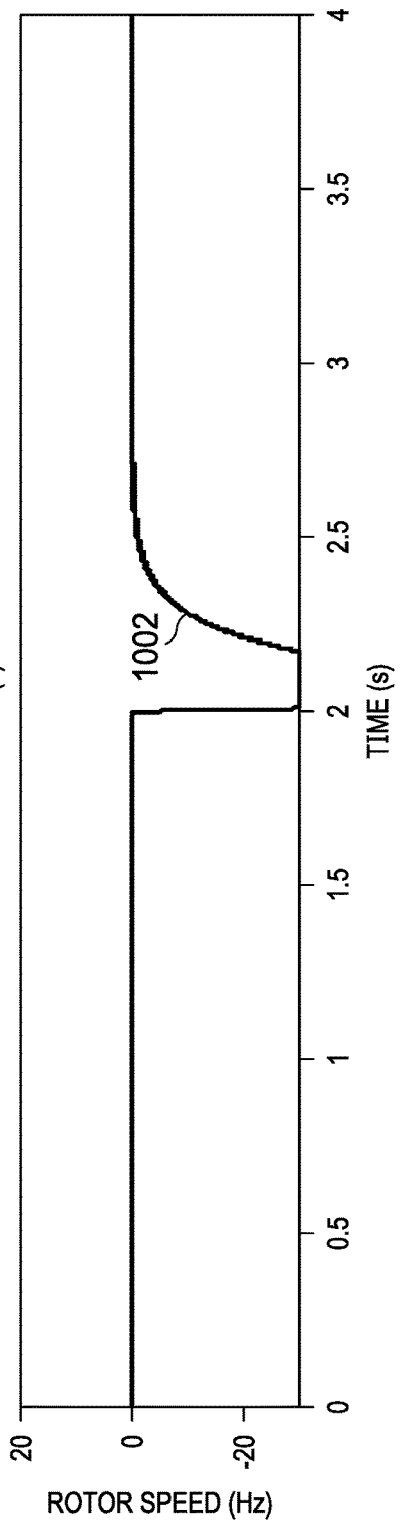
Figure 10C:
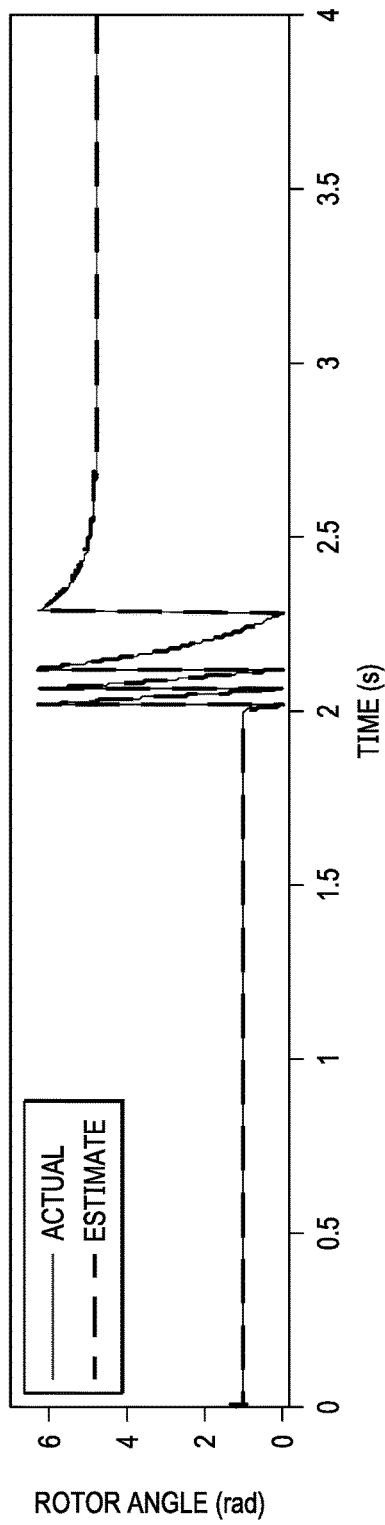
Figure 12A:
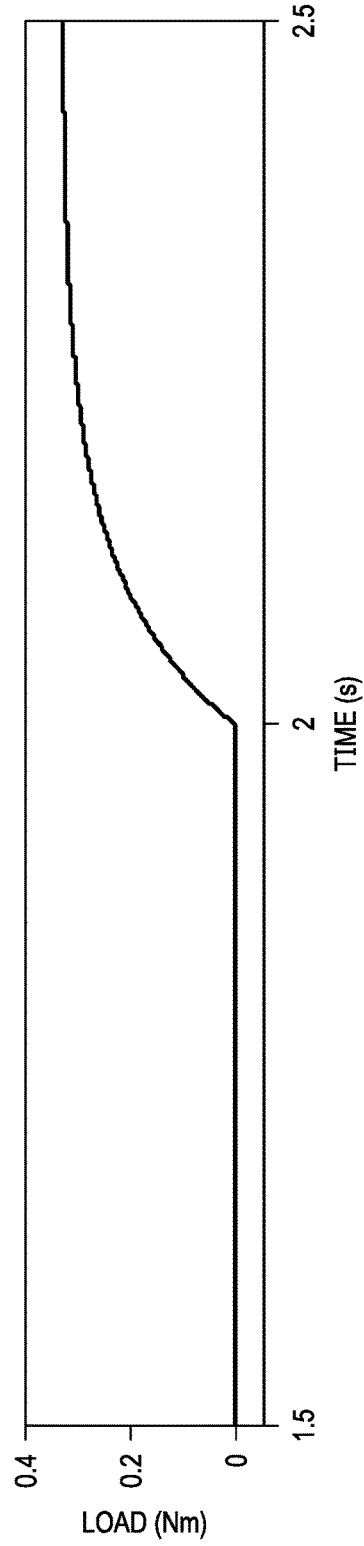
Figure 12B:
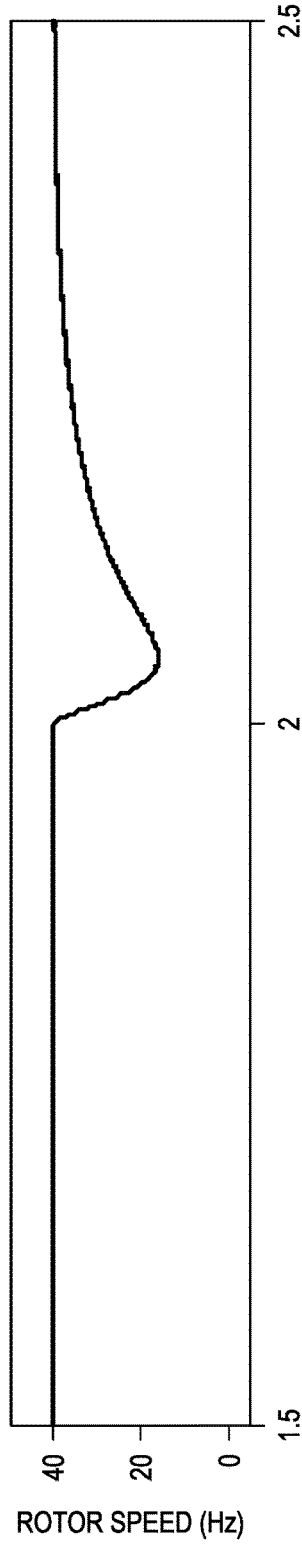
Figure 12C:
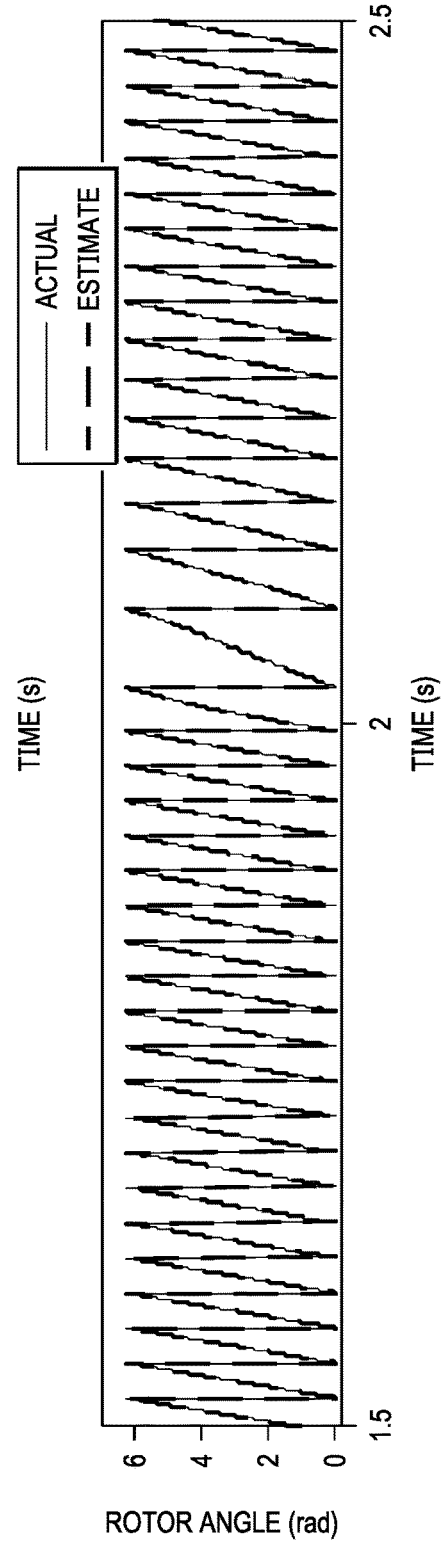

FIGS. 10A-10C, 11A-11C, and 12A-12C are plots illustrating operation of a motor with a motor control using the rotor angle estimation logic of FIG. 8. FIGS. 10A, 11A, and 12A are plots of load (units of Newton meter) vs. time (units of seconds). FIGS. 10B, 11B, and 12B are plots of rotor speed (units of Hertz) vs. time (units of seconds). FIGS. 10C, 11C, and 12C are plots of rotor angle (units of radians) vs. time (units of seconds). Note that 360 degrees is equivalent to $2\pi$ radians.

FIGS. 10A-10C illustrate operation of motor 100 at zero speed with a load of 120% impressed at time equal to two seconds as indicated at 1001. LUT rotor angle estimation logic 820 (FIG. 8) successfully tracks rotor angle at zero speed as indicated at 1002.

FIGS. 11A-11C illustrate operation of motor 100 at zero load with a transition from zero rotation to 40 Hz electrical speed at time equal to two seconds as indicated at 1101. LUT rotor angle estimation logic 820 (FIG. 8) successfully tracks rotor angle as indicated at 1102.

FIGS. 12A-12C illustrate operation of motor 100 at a speed of 40 Hz electrical speed with a load of 120% impressed at time equal to two seconds as indicated at 1201. LUT rotor angle estimation logic 820 (FIG. 8) successfully tracks rotor angle at 40 Hz speed as indicated at 1202.

Thus, a rotor angle estimation scheme using a lookup table as described herein extracts position information from both the d and q components of the current. Further, a look up table, such as LUT 827, can be used to generalize the map from the demodulated current signature to the rotor angle. A phase correction block, such as phase angle correction block 828, enables greater flexibility in the demodulation filter design which can introduce significant phase delay when designed for higher passband attenuation and thereby improves the angle estimation accuracy. The rotor angle estimation scheme described herein reduces rotor position ambiguity from four possibilities to two, which can be further eliminated by measuring average current in response to core behavior during saturation, as described in more detail hereinabove. The rotor angle estimation scheme described herein is more robust to large load steps which can cause conventional PLL based approaches to not function as desired.

Figure 13:
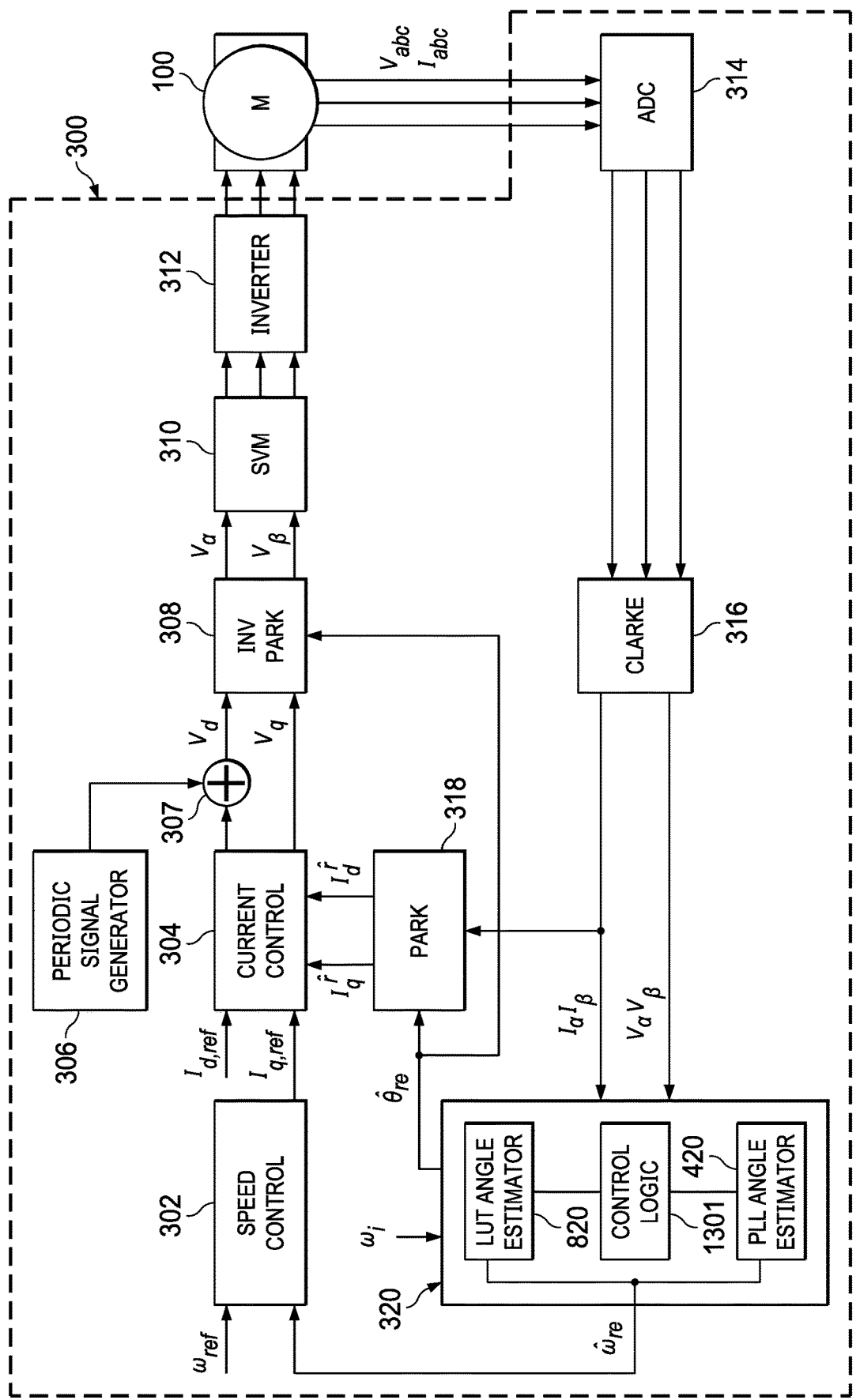
FIG. 13 is a block diagram showing more detail of the position/speed estimation logic of FIG. 3.

FIG. 13 is a block diagram showing more detail of the position/speed estimation logic 320 of FIG. 3. In this example, PLL tracking observer rotor angle estimation logic 420 and sin/cos LUT rotor angle estimation logic 820 each operate in tandem as described hereinabove. The LUT sin/cos approach is more robust to transients, whereas the tracking observer approach filters out random noise such as that due to quantization better. The advantages of both are obtained by using the LUT logic beyond a selected error threshold and the tracking observer logic within the threshold.

Control logic 1301 monitors the estimated rotor angle error value produced by the observer rotor angle estimation logic 420. When the motor is initially at rest, the PLL observer logic is selected. While the estimated rotor angle error is below a threshold value, the $\hat{\omega}_{re}$ and $\hat{\theta}_{re}$ outputs are provided by the PLL rotor angle estimation logic 420 to speed control logic 302 and Park transform 318 respectively in response to control logic 1301. When the rotor angle error estimation exceeds the threshold value, then the $\hat{\omega}_{re}$ and $\hat{\theta}_{re}$ outputs are provided by the LUT rotor angle estimation logic 820 to speed control logic 302 and Park transform 318 respectively in response to control logic 1301. In this example, the threshold value may be adjustable under control of a system controller. A rotor angle error threshold value of approximately 30 degrees provides a good balance.

Once the speed of motor 100 exceeds an emf speed threshold at which control based on back emf (electromagnetic field) from motor 100 can be used, then control system 300 may switch over and use back emf based estimation techniques for speed control purposes.

Figure 14:
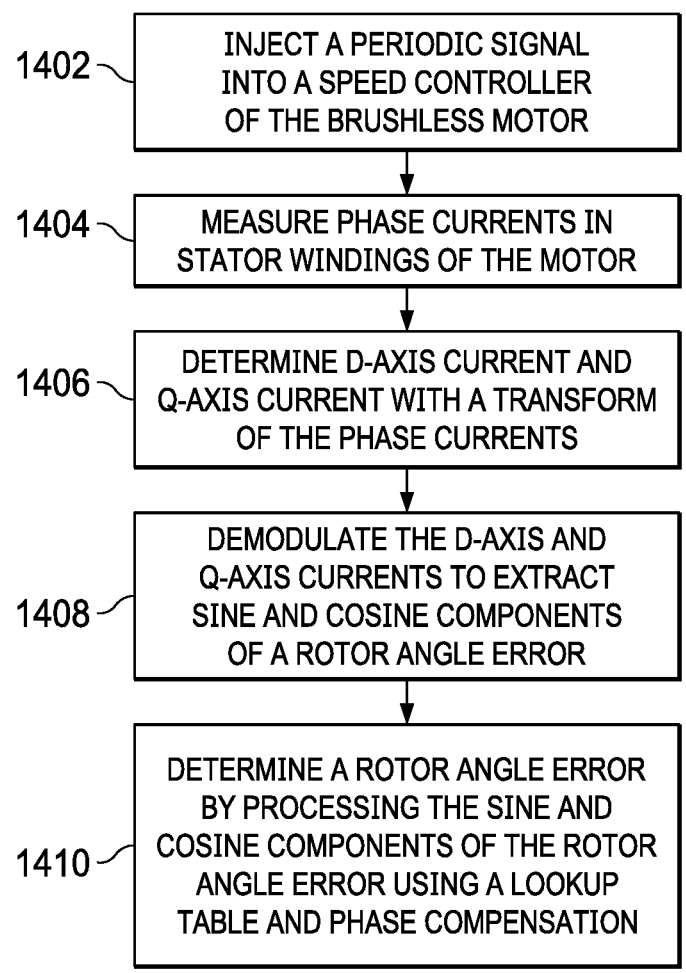
FIG. 14 is a flow diagram of rotor angle estimation using a LUT and compensation logic.

FIG. 14 is a flow diagram of rotor angle estimation using a LUT and compensation logic. As described in detail hereinabove, rotor position sensing based only on a PLL model may fail due to large step changes in load that may cause a breakdown in the linearity of the PLL model. Information from the sine and cosine components of the angle error may be employed at high values of angle error. Effective use of angle error information at large values of angle error provides a robust solution and may be extended to arbitrary mappings between angle error and current signature.

At 1402, a periodic signal is injected into a speed controller of a brushless motor, such as brushless motor 100 of FIG. 1. The periodic signal, results in a periodic component in a driving voltage for the motor, which can be demodulated to generate a signal whose amplitude variation is proportional to $\sin(2\hat{\theta}_{re})$, which is the sine of twice the angle error.

At 1404, phase currents in the field windings of the motor are measured. The current sensors may be low value resistors that produce a voltage signal that is proportional to the field currents in the motor. In some examples, one of the three phases is monitored and in other examples, two or three phases are monitored. The voltage signals are analog values and are input to an analog to digital converter (ADC), which outputs digital values representing the measured currents.

At 1406, the signals represented the measured field current are transformed to generate a d-axis current signal and a q-axis current signal. In this example, a Clark transform is used the generate alpha/beta domain currents, and then a Park transform is used to transform the alpha/beta domain currents to the d-axis and q-axis current signals.

At 1408, the d-axis and q-axis currents are demodulated to extract sine and cosine components of a rotor angle because the sine and cosine parts of the angle error are modulated by the injected frequency. In this example, the $I_d$ current, is demodulated using $\sin(\omega_i t)$ and low pass filtered to remove high frequency components. The $I_q$ current is demodulated using $\sin(\omega_i t)$ and low pass filtered to remove high frequency components. The demodulated q-axis component contains a DC term which can be subtracted out assuming knowledge of the amplitude of the injected signal $V_i$, it's frequency $\omega_i$, and the inductances $L_0$ and $L_2$, as described in more detail hereinabove. Standard averaging methods to remove the DC component are limited at lower speeds where the attenuation provided by the averaging function is small.

At 1410, a rotor angle estimate is determined by processing the sine and cosine components of the rotor angle. The outputs of the demodulation stage can be processed by a look up table (LUT), such as LUT 827 (FIG. 8), to extract an intermediate estimate of rotor angle. This estimate is further corrected for the phase lag introduced by the demodulation filters using a LPF phase compensation logic, such as LPF compensation logic 828 (FIG. 8), to obtain an accurate estimate of the rotor angle. The compensation logic generates rotor angle $\hat{\theta}_{re}$ which is then provided to the Park transform logic that generates the d-axis and q-axis currents. The compensation logic also generates a rotor speed estimate $\hat{\omega}_{re}$ which is then provided to speed control logic, such as logic 302 (FIG. 3).

Figure 15:
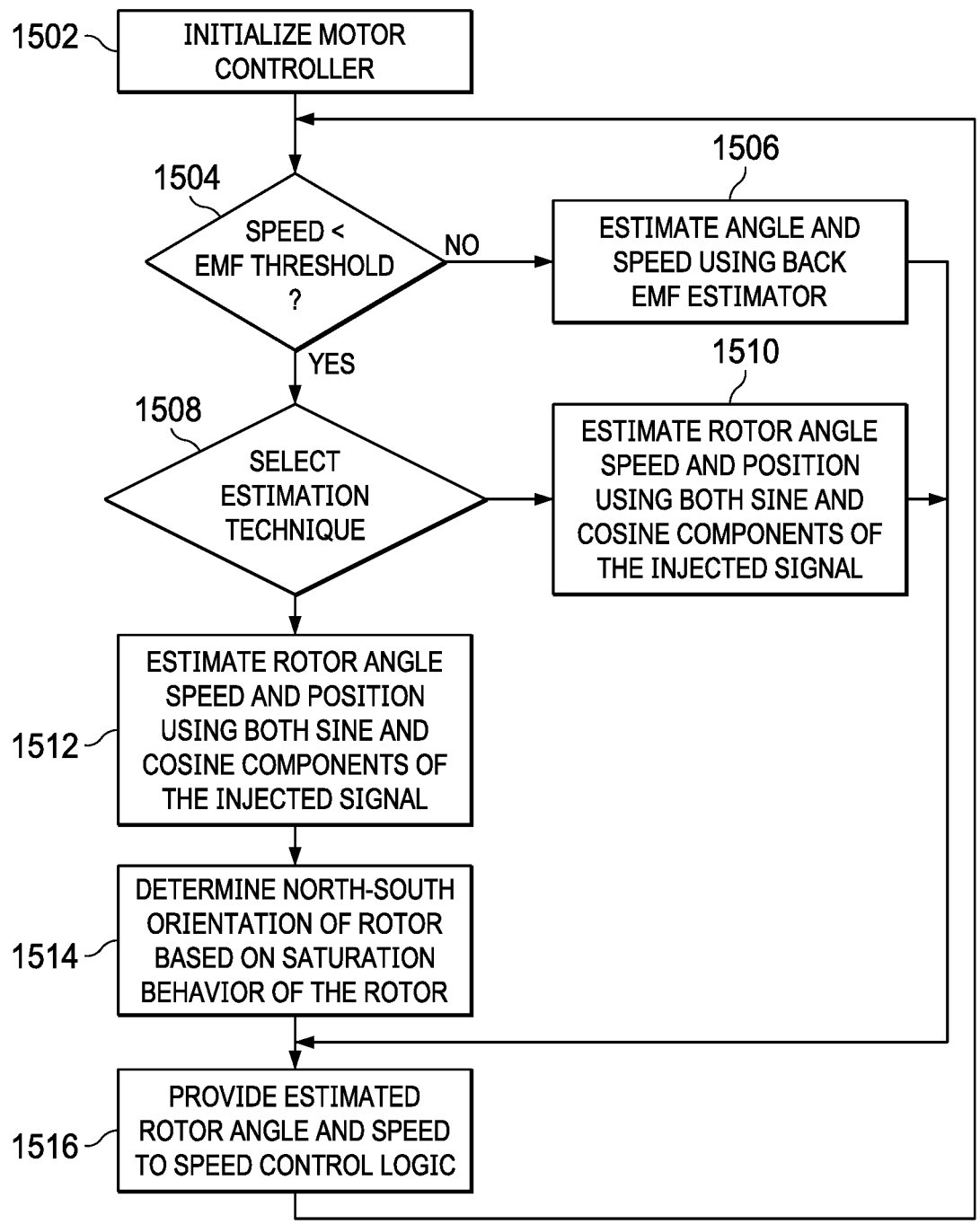
FIG. 15 is a flow diagram of rotor angle estimation using a combination of techniques.

FIG. 15 is a flow diagram of rotor angle estimation using a combination of techniques. At 1502, a sensorless motor controller, such as field oriented controller 300 (FIG. 13) is initialized and a target rotation rate is provided to the controller, such as signal $\omega_{ref}$ (FIG. 13), which may also be expressed as a frequency.

At 1504, the current speed of the rotor is compared to an emf threshold. Once the speed of a motor, such as motor 100 (FIG. 13) exceeds an EMF threshold at which estimation based on back emf from the motor can be used, then the control system may switch over and use back emf estimation for speed control purposes at 1506. While the speed of the motor is below the emf threshold, the sensorless motor control calculates rotor position based on a periodic signal injection, such as PSI 306 (FIG. 13), that is injected into the voltage being provided to the motor. In this example, the emf threshold is approximately 10 Hz when the motor speed is increasing from zero with a higher threshold when the motor speed is decreasing towards zero. In other examples higher or lower thresholds may be selected. Once the increasing speed back emf threshold or the decreasing speed back emf threshold is crossed, the signal injection and back emf estimation algorithms need some overlap while control is transitioned from one to the other. Once an emf threshold is crossed, both algorithms run in parallel until the algorithm that is taking over control generates estimated values near the values from the active algorithm.

At 1508, selection logic decides which estimation technique to use. In this example, an estimated rotor angle error is compared to an error threshold, however, in other examples a different parameter may be used to select which estimation technique to use. While the estimated rotor angle error is less than the error threshold, rotor angle and rotor speed is estimated at 1510 using an observer model, such as PLL observer 424 (FIG. 4) or Luenberger observer 624 (FIG. 6), with only sine components of the injected periodic signal. In this example, the error threshold is selected to be approximately 30 degrees; however, in other examples a larger or smaller error threshold may be selected based on the operating characteristics of the motor, for example.

At 1512, while the estimated rotor angle is greater than the error threshold, rotor angle and rotor speed is estimated using both sine and cosine components of the HFI signal. As described in more detail hereinabove, d-axis and q-axis components of measured phase currents may be demodulated and filtered to extract the sine and cosine components which are then used to access a lookup table that provides an estimated rotor angle and speed. Phase compensation is used to correct for phase lag that is introduced by the demodulation filters. A current estimated rotor angle $\hat{\theta}_{re}$ and a rotor speed estimate $\hat{\omega}_{re}$ is output from the compensation logic.

At 1514, a north-south orientation of the rotor is determined based on the rotor saturation behavior by determining an average value of the current magnitude resulting, from the injected signal, as described in more detail hereinabove.

At 1516, the estimated rotor angle $\hat{\theta}_{re}$ generated at 1512, 1510 or 1506 is then provided to a Park transform, such as Park transform logic 318 (FIG. 13), that generates the d-axis and q-axis currents. The rotor speed estimate $\hat{\omega}_{re}$ is provided to speed control logic, such as speed control logic 302 (FIG. 13).

OTHER EXAMPLES

In described examples, a PLL observer or a Luenberger observer is used. In other examples, other known or later developed observers may be used.

In described examples, a lookup table is used to process the sine and cosine components. In another example, a complex mathematical model may be used to process the sine and cosine components to produce an estimated rotor angle error and estimated rotor speed.

In described examples, the motor control, such as motor control 300 (FIG. 3) may include hardwired logic to perform the various control functions described hereinabove. In other examples, a programmable device, such as a microprocessor core or other type of processor may execute stored instructions to perform the various control functions described hereinabove.

In described examples, Park and Clark transform functions are used to process the measured phase current. In other examples, other known or later developed transform functions may be used for processing the measured phase current.

In described examples, a square wave is used as the injected signal; however, other signal types such as a sine wave can be used. Some rounding of the signal edges may occur.

In described examples, an error threshold of approximately 30 degrees is used. This value is not critical and may be selected from a wide range of values.

In described examples, a load of 0.2-0.3 Nm for example motor 100 is illustrated. In other examples, motors that are designed for larger or smaller loads may be operated using the same control techniques as described hereinabove.

In described examples, a field oriented control loop for controlling motor rotational speed is illustrated. In other examples, a field oriented control loop needing position and velocity estimation for other uses, such as position control, velocity control, torque control, etc. may utilize the LUT based estimation techniques described hereinabove.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Modifications are possible in the described examples, and other examples are possible, within the scope of the claims.

What is claimed is:

1. A method for controlling a brushless motor, the method comprising:
   injecting a periodic signal into a field oriented controller of the brushless motor, the motor having a rotor and a stator;
   measuring phase currents in stator windings of the brushless motor;
   determining a d-axis current and a q-axis current with a transform of the phase currents;
   demodulating the d-axis current and the q-axis current to extract an angle dependent current signature that includes a sine component of a rotor angle estimate and a cosine component of the rotor angle estimate, in which demodulating the d-axis current includes correcting a direct current (DC) offset of the demodulated d-axis current; and
   determining the rotor angle estimate by processing the sine component and cosine component.

2. The method of claim 1, wherein processing the sine component and the cosine component uses a lookup table.

3. The method of claim 2, wherein demodulating the d-axis current and the q-axis current includes removing high frequency components using a low pass filter and/or a bandpass filter.

4. The method of claim 3, further comprising compensating for phase angle lag produced by the low pass filter and/or band pass filter during demodulating the d-axis current and the q-axis current.

5. The method of claim 2, wherein the lookup table supports a complex mapping between the rotor angle estimate and the d-axis current and q-axis current.

6. The method of claim 1, further comprising determining a north-south orientation of the rotor by measuring an average current resulting from the injected signal.

7. A method for controlling a brushless motor, the method comprising:
   injecting a periodic signal into a field oriented controller of the brushless motor, the motor having a rotor and a stator;
   measuring phase currents in stator windings of the brushless motor;
   determining a d-axis current and a q-axis current with a transform of the phase currents;
   demodulating the d-axis current and the q-axis current to extract an angle dependent current signature that includes a sine component of a rotor angle estimate and a cosine component of the rotor angle estimate;
   determining the rotor angle estimate by processing the sine component and cosine component;
   determining whether the error angle is less than an error threshold value;
   demodulating only the q-axis current to extract a sine component of the angle error while the angle error is less than the error threshold value; and
   determining the rotor angle error by processing only the sine component with a tracking observer while the angle error is less than the error threshold value.

8. The method of claim 7, wherein demodulating the d-axis current includes correcting a direct current (DC) offset of the demodulated d-axis current.

9. A motor controller comprising:
a periodic signal generator configured to provide a periodic signal;
injection circuitry coupled to the periodic signal generator and adapted to be coupled to stator windings of a motor, the injection circuitry configured to receive the periodic signal from the periodic signal generator and to provide a drive voltage that includes the periodic signal to the stator windings;
a current monitor adapted to be coupled to the stator windings, the current monitor configured to measure field current in the stator windings; and
a position estimator coupled to the current monitor, the position estimator configured to determine a rotor angle estimate of a rotor of the motor based on the field current, wherein the position estimator includes:
first estimation logic configured to process a sine component and a cosine component of the periodic signal measured in the field current in the stator windings;
second estimation logic configured to process only the sine component of the periodic signal measured in the field current using a tracking observer to generate a rotor angle estimate; and
control logic configured to: select a rotor angle estimate from the first estimation logic responsive to the rotor angle error being greater than an error threshold; and select a rotor angle estimate from the second estimation logic responsive to the rotor angle error being less than the error threshold.

10. The motor controller of claim 9, wherein the position estimator includes a lookup table, and the position estimator is configured to use the lookup table in processing the sine component and the cosine component.

11. The motor controller of claim 10, wherein the lookup table supports a complex mapping between the rotor angle estimate and the sine component and the cosine component.

12. The motor controller of claim 10, wherein the position estimator includes:
a demodulator configured to extract the sine component and the cosine component from the field current;
a low pass filter coupled to an output of the demodulator, the low pass filter configured to remove high frequency components, and the low pass filter having an output coupled to an input of the lookup table; and
a compensator coupled to an output of the lookup table, the compensator configured to compensate phase delay produced by the low pass filter.

13. The motor controller of claim 9, wherein the position estimator includes orientation logic coupled to the current monitor, the orientation logic configured to determine north-south orientation of the rotor based on an average current of the periodic signal measured in the field current.

14. A motor controller comprising:
a periodic signal generator configured to provide a periodic signal;
injection circuitry coupled to the periodic signal generator and adapted to be coupled to stator windings of a motor, the injection circuitry configured to receive the periodic signal from the periodic signal generator and to provide a drive voltage that includes the periodic signal to the stator windings;
a current monitor adapted to be coupled to the stator windings, the current monitor configured to measure field current in the stator windings; and
a position estimator coupled to the current monitor, the position estimator configured to determine a rotor angle estimate of a rotor of the motor based on the field current, wherein the position estimator includes:
estimation logic configured to process a sine component and a cosine component of the periodic signal measured in the field current in the stator windings;
a lookup table, the position estimator configured to use the lookup table in processing the sine component and the cosine component;
a demodulator configured to extract the sine component and the cosine component from the field current;
a low pass filter coupled to an output of the demodulator, the low pass filter configured to remove high frequency components, and the low pass filter having an output coupled to an input of the lookup table;
a compensator coupled to an output of the lookup table, the compensator configured to compensate phase delay produced by the low pass filter; and
correction logic coupled to the demodulator, the correction logic configured to correct a direct current offset of the demodulated cosine component.

15. The motor controller of claim 14, wherein the estimation logic is first estimation logic, and the position estimator includes:
second estimation logic configured to process only the sine component of the periodic signal measured in the field current using a tracking observer to generate a rotor angle estimate; and
control logic configured to: select a rotor angle estimate from the first estimation logic responsive to the rotor angle error being greater than an error threshold; and select a rotor angle estimate from the second estimation logic responsive to the rotor angle error being less than the error threshold.

16. A system, comprising:
a permanent magnet motor having a rotor and a stator with stator windings; and
a motor controller coupled to the stator windings, the motor controller configured to control a magnetic field of the motor, wherein the motor controller includes:
a periodic signal generator configured to provide a periodic signal;
injection circuitry coupled to the periodic signal generator and to the stator windings, the injection circuitry configured to receive the periodic signal from the periodic signal generator and to provide a drive voltage that includes the periodic signal to the stator windings;
a current monitor coupled to the stator windings, the current monitor configured to measure field current in the stator windings; and
a position estimator coupled to the current monitor, the position estimator configured to determine a rotor angle estimate of the rotor based on the field current;
wherein the position estimator includes:
first estimation logic configured to process a sine component and a cosine component of the periodic signal measured in the field current in the stator windings;
second estimation logic configured to process only the sine component of the periodic signal measured in the field current to generate a rotor angle estimate; and
control logic configured to: select a rotor angle estimate from the first estimation logic responsive to the rotor angle error being greater than an error threshold; and select a rotor angle estimate from the second estimation logic responsive to the rotor angle error being less than the error threshold.

17. The system of claim 16, wherein the position estimator includes a lookup table, and the position estimator is configured to use the lookup table in processing the sine component and the cosine component.

18. The system of claim 16, wherein the position estimator includes:
- a demodulator configured to extract the sine component and the cosine component from the field current;
- a low pass filter coupled to an output of the demodulator, the low pass filter configured to remove high frequency components, and the low pass filter having an output coupled to an input of the lookup table; and
- a compensator coupled to an output of the lookup table, the compensator configured to compensate phase delay produced by the low pass filter.

19. The system of claim 16, wherein the position estimator includes orientation logic coupled to the current monitor, the orientation logic configured to determine north-south orientation of the rotor based on an average current of the periodic signal measured in the field current.

* * * * *